UNITED STATES PATENT OFFICE.

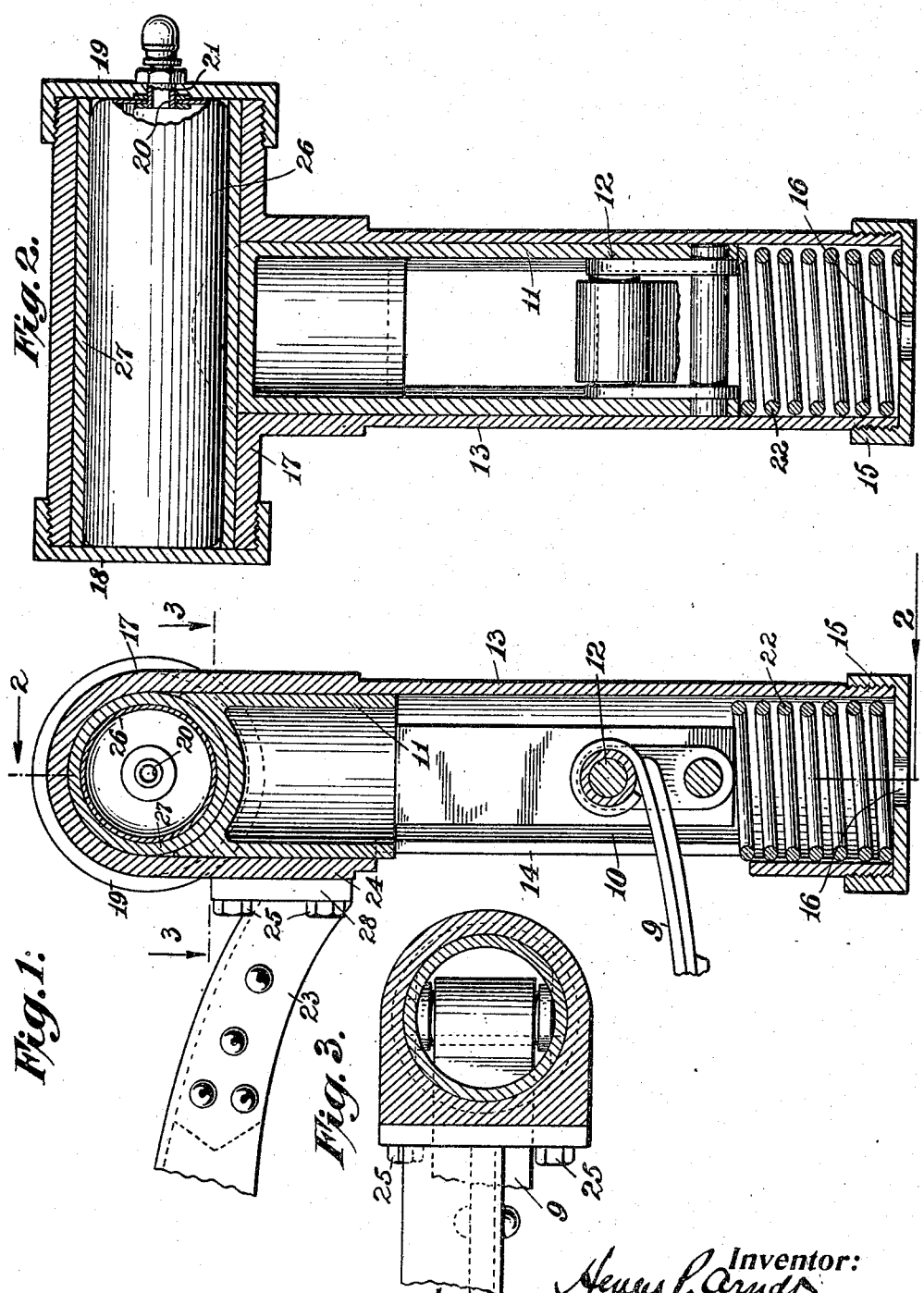

HENRY P. ARNDT, OF AMSTON, CONNECTICUT, ASSIGNOR OF TWO-THIRDS TO CHARLES M. AMS, OF NEW YORK, N. Y.

PNEUMATIC VEHICLE-SPRING.

1,276,310.  Specification of Letters Patent.  Patented Aug. 20, 1918.

Original application filed October 4, 1916, Serial No. 123,753. Divided and this application filed November 16, 1917. Serial No. 202,274.

*To all whom it may concern:*

Be it known that I, HENRY P. ARNDT, a citizen of the United States, and a resident of Amston, county of Tolland, and State of Connecticut, have invented certain new and useful Improvements in Pneumatic Vehicle-Springs, of which the following is a specification.

This invention relates generally to springs for vehicles, with more particular reference to self-propelled vehicles and to primarily pneumatic cushioning means adapted to be interposed between the running-gear and the body, or between the body and the usual semi-elliptic or three-quarter elliptic laminated springs, of a vehicle.

The present application is a division of my earlier application, filed October 4, 1916, Serial No. 123,753, in which I have set forth exhaustively the defects and objections which in the present invention I seek to overcome. The device of the parent application, aforesaid, was primarily designed for use in connection with the front springs of a vehicle, and the device of the present application for use in connection with the rear springs. This, however, was largely due to the fact that the former is inherently more sightly and capable of a much higher degree of ornamentation than the latter—an important consideration, in view of the fact that they are always exposed to view—and to the fact that under present approved or standardized types of construction there is rarely, if ever, sufficient head-room at the rear of the vehicle for the interposition of a cushion-device of the type and design shown and described in the parent application, aforesaid, between each of the rear springs and the body-supporting frame of the vehicle. As a matter of fact, from the standpoint of effectiveness alone, I prefer the device of this application, but all things considered, for the reasons stated above and for the additional reason that the strains of use are not so great upon the front springs of a vehicle of the modern self-propelled type nor are shocks and jars so readily transmitted therefrom to the seat or seats, the device of the parent application is doubtless to be preferred for use in connection with the front springs of the vehicle.

My invention will be readily understood by reference to the accompanying drawings, forming a part of this specification, in which—

Figure 1 is a central sectional elevation of a pneumatic cushioning device for vehicles and constituting a practical and convenient embodiment of my invention;

Fig. 2 is a transverse sectional view, taken substantially on the line 2—2 of Fig. 1, and Fig. 3 is a horizontal section, taken substantially on the line 3—3 of Fig. 1.

Referring now to the drawings in detail, numeral 9 designates the usual laminated semi-elliptic or three-quarter elliptic spring for vehicles, such as is commonly associated with the axle of almost all types of automobiles. The end of the spring 9 passes through the slotted opening 10 in a cylindrical plunger 11 wherein it is pivotally secured by means of the pin 12. The plunger 11 is telescopically mounted within the cylindrical casing 13, and a slot 14 in the casing 13 registers with the slot 10 in the plunger 11.

At its lower end, the casing 13 is provided with a screw-cap 15, having an air-exhaust opening 16 at the center thereof, and at its upper end said casing terminates in a horizontally-disposed cylindrical portion 17 the ends of which are closed by screw-caps 18 and 19, one thereof having a hole 21 at its center for a purpose which will be hereinafter described.

The forward end of the usual side member 23 of the body-supporting frame—now more generally pivoted or linked directly to the contiguous end of the spring 9—is secured to the casing 13, preferably by means of bolts 25 25 screwed through the plate 28 at the end of the member 23 and into an integral reinforcing boss 24 on said casing. A coil-spring 22 is interposed between the screw-cap 15 and the lower end of the plunger 11 and tends to yieldingly resist downward movement of said plunger, or reactive movement thereof under influence of the pneumatic cushion now about to be described.

Within the horizontally-disposed cylindrical portion 17 of the casing 13, I insert an inflated air-tight sack or bag 26, preferably of comparatively thin, soft rubber, such as that from which the well-known inner tubes for pneumatic tires are made, but which may be of any suitable flexible and impermeable or impervious material, being intended to provide a distortable lining for said chamber to hermetically seal the same. One end of the lining sack or bag 26 is provided with the usual and well-known valve-stem 20 projecting through the hole 21 in the cap 19 in which it is suitably secured, for the purpose of inflating and deflating the sack or bag 26.

In view of the fact that the plunger 11 acts against the side, instead of against the end, of the elongated sack or bag 26, I find it desirable—if not actually essential for practical purposes—to provide a suitable reinforcement for the necessarily thin and exceedingly flexible side wall of this detachable hermetic lining. Therefore, prior to inserting the sack or bag 26 in the horizontally-disposed portion 17 of the casing 13, I place therein a substantially snugly fitting, open-ended cylinder 27, of yielding material but relatively much stiffer than the material of the lining 16, such as harder rubber, preferably reinforced with fabric. I have found that a section of ordinary rubber hose will satisfactorily suffice for this purpose.

As was set forth in connection with the device of the parent application, aforesaid, when an abrupt depression in the road is encountered, the wheels, under action of gravity augmented by the energy stored in the springs 9, will first drop into such depression, downward movement of the body of the vehicle following more slowly due to inertia augmented by the momentum of the moving body, and this results in an initial separation of the ends of the parts 9 and 23 and what may be termed a consequent expansion of the cylinders 11 and 13. However, downward movement of the part 23 and therewith the cylindrical casing 13, under the weight of the body of the vehicle, immediately follows, the shock or jar which would otherwise result being dissipated by the yielding resistance of the air-cushion in the chamber between the cylinders 13 and 11 combined with that of the spring 9. It is well known that the "re-bound" of the body, due to the energy stored in the spring 9 and in said chamber through compression of the air therein upon collapse of said cylinders, is generally even more disagreeable and objectionable than the initial abrupt downward movement. The effect of this "re-bound" is minimized by the spring 22, which takes up the forces thereof in gradually increasing degree and gently restoring the normal conditions of equilibrium.

In the same way, when an obstruction is encountered in the road, the wheels first receive the upwardly-directed impulses, causing the ends of the parts 9 and 23 to approach each other and the collapse of the cylinders 13 and 11, the forces which would otherwise cause a jolt or jar being taken up by the pneumatic cushion coupled with the yielding resistance of the spring 9. The forces of the "re-bound" are similarly taken up and minimized in effect by the spring 22.

In fact, it may be stated that a peculiar relationship exists between the interconnected pneumatic cushion, the spring 9 and the spring 22. In just what manner these three instrumentalities coöperate under all conditions I am unable to state, but my experience has demonstrated that they do coöperate for the accomplishment of the purposes set forth with eminently satisfactory results.

Many modifications of minor details of my improved vehicle spring will doubtless readily suggest themselves to those skilled in the art to which it appertains, and I therefore do not desire to limit my invention to the specific construction herein shown and described.

I claim as new and desire to secure by Letters Patent:

1. In a device of the character described, the combination of a cylinder, a plunger adapted to reciprocate therein, said cylinder being provided with and open to a transversely disposed top portion having closed ends and constituting an elongated chamber, a flexible hermetic lining for said chamber providing a pneumatic cushion toward the side of which said plunger is directed, an open-ended, flexible reinforcing casing surrounding said lining, and means for connectively interposing said cylinder and plunger between the body and the running gear of a vehicle.

2. In a device of the character described, the combination of two hollow members in telescopic arrangement and providing an elongated chamber of substantially greater length than width, the inner member having a closed upper end and the outer being provided with and open to a transversely disposed hollow top portion having closed ends, a pneumatic cushion in said top portion against the side of which the closed upper end of said inner member is adapted to impinge, and means for connectively interposing said members between the body and the running gear of a vehicle.

3. In a device of the character described, the combination of two telescoping cylinders providing a chamber of substantially greater length than diameter, the inner cylinder having a closed upper end and the outer being provided with and open to a transversely disposed cylindrical top portion having closed ends, a pneumatic cushion in said top portion against the side of which the closed upper end of said inner cylinder is adapted to impinge, and means for connectively interposing said cylinders between the body and the running gear of a vehicle.

4. In a device of the character described, the combination of two hollow members in telescopic arrangement, the inner having a closed upper end and the outer being provided with and open to a transversely disposed hollow top portion having closed ends, a pneumatic cushion in said top portion against the side of which said closed upper end of the inner member is adapted to impinge, said closed upper end being complementally of the same contour as the side of said cushion against which it impinges, and means for connectively interposing said members between the body and the running gear of a vehicle.

5. In a device of the character described, the combination of two telescoping cylinders, the inner having a closed upper end and the outer being provided with and open to a transversely disposed cylindrical top portion having closed ends, a pneumatic cushion in said top portion against the side of which said closed upper end of the inner cylinder is adapted to impinge, said closed upper end being in-curved to correspond to the cylindrical configuration of said cushion, and means for connectively interposing said cylinders between the body and the running gear of a vehicle.

6. In a device of the character described, the combination of two telescoping cylinders, the inner having a closed upper end and the outer being provided with and open to a transversely disposed cylindrical top portion having closed ends and providing an elongated chamber, a flexible hermetic lining for said chamber constituting a pneumatic cushion toward the side of which the top of the inner cylinder is directed, an open-ended flexible reinforcing casing surrounding said lining, and means for connectively interposing said cylinders between the body and the running gear of a vehicle.

7. In combination, with the side member of the body-supporting frame of a motor vehicle, and a semi-elliptic spring having one end connected with said member intermediate the ends of the latter, of a device comprising two hollow members in telescopic arrangement, the inner having a closed upper end and the outer being provided with and open to a transversely disposed top portion having closed ends, a pneumatic cushion in said top portion against the side of which the closed upper end of said inner member is adapted to impinge, said outer hollow member being rigidly secured to the end of said side member of the frame, and said inner hollow member being provided with registering longitudinal slots and the other end of said spring passing through said slots, and means within said inner hollow member for securing therein said spring-end.

8. In combination, with the side member of the body-supporting frame of a motor vehicle, and a semi-elliptic spring having one end connected with said member intermediate the ends of the latter, of a device comprising two telescoping cylinders, the inner having a closed upper end and the outer being provided with and open to a transversely disposed cylindrical top portion against the side of which the closed upper end of said inner cylinder is adapted to impinge, said outer hollow member being rigidly secured to the end of said side member of the frame, said inner cylinder being provided with registering longitudinal slots and the other end of said spring passing through said slots, and means within said inner cylinder for securing therein said spring-end.

9. In a device of the character described, the combination of a cylinder, a plunger adapted to reciprocate therein, said cylinder being provided with and open to a transversely disposed top portion having closed ends and constituting an elongated chamber, a flexible hermetic lining for said chamber providing a pneumatic cushion against the side of which said plunger impinges, a spring associated with said plunger to yieldingly oppose the reactive forces of said cushion when compressed, and means for connectively interposing said cylinder and plunger between the body and the running gear of a vehicle.

10. In combination, with the side member of the body-supporting frame of a motor vehicle, and a semi-elliptic spring having one end connected with said member intermediate the ends of the latter, of a device comprising a cylinder having a longitudinally disposed slot therein, a plunger adapted to reciprocate therein, said cylinder being provided with and open to a transversely disposed top portion having closed ends and constituting an elongated chamber, and a flexible hermetic lining for said chamber providing a pneumatic cushion against the side of which said plunger impinges, said outer hollow member being rigidly secured to the end of said side member of the frame, and the other end of said spring passing through said slot and being secured to said plunger.

In testimony of the foregoing I have hereunto set my hand in the presence of two witnesses.

HENRY P. ARNDT.

Witnesses:
 MARK NAVE,
 L. REISMAN.